Nov. 20, 1923.

H. W. CARPENTER

ELECTRIC RECORDING METER

Filed Nov. 4, 1922

INVENTOR
Harold W. Carpenter
BY
ATTORNEY

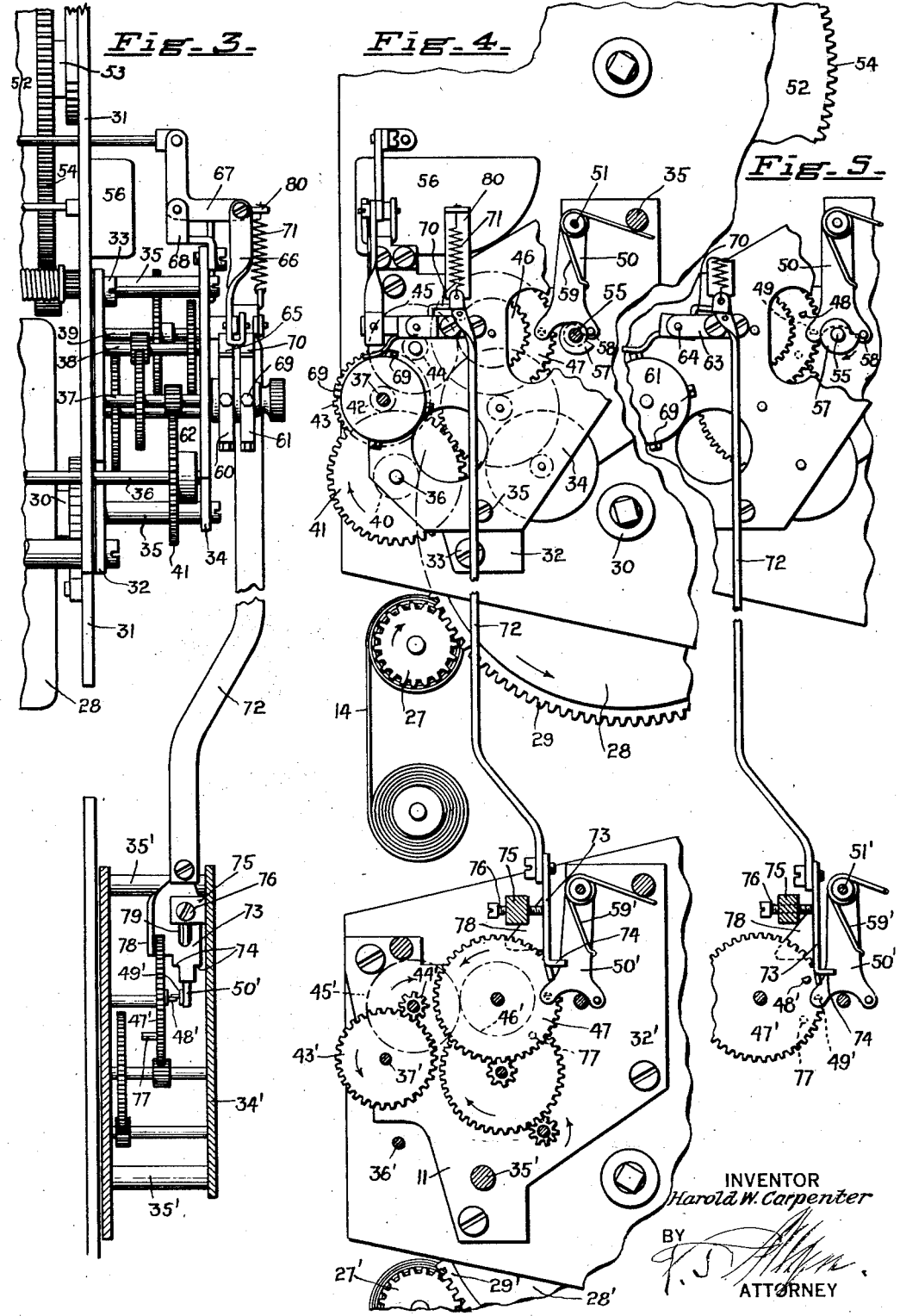
Nov. 20, 1923.
H. W. CARPENTER
ELECTRIC RECORDING METER
Filed Nov. 4, 1922
1,474,955
2 Sheets-Sheet 2

Patented Nov. 20, 1923.

1,474,955

UNITED STATES PATENT OFFICE.

HAROLD WAIT CARPENTER, OF NORWICH, CONNECTICUT.

ELECTRIC RECORDING METER.

Application filed November 4, 1922. Serial No. 598,964.

*To all whom it may concern:*

Be it known that I, HAROLD W. CARPENTER, a citizen of the United States of America, and residing at Norwich, in the county of New London and State of Connecticut, have invented new and useful Improvements in Electric Recording Meters, of which the following is a specification.

In many systems of charging for electric power, account is taken of the average power factor of the consumer's load over a given period, as well as of the consumer's demand rate. In determining the average power factor as well as the demand, two demand recording watt hour meters are employed, one of which is connected so as to measure the active component or watts while the other measures the reactive component or reactive volt amperes of the load. In order that the power factor for any given interval may be accurately determined, it is necessary to know the value of both components for the same interval.

In the usual commercial type of demand recording watt hour meter, the meter runs at a speed proportional to the power passing therethrough, and drives a number of hands cooperating with registration dials to indicate the total power consumed by the load. A moving arm also driven by the meter carries means such as a pen for making a graphic record of the power consumed on a movable chart such as a roll of paper. Means such as a spring motor drives the mechanism which advances the chart and resets the pen to its zero position. The operation of the paper feeding mechanism is governed by a second spring motor which drives suitable clock work arranged to periodically permit the first spring motor to function. Thus two spring motors are employed with each meter, one to supply power for moving the chart, and the other to regulate the time interval between successive operations of the first spring. When two independent meters are employed to measure different components of a load, the time of the chart advance on each meter is governed by its own clock spring, and since no two clock mechanisms run at precisely the same speed, the interval during which one meter records the demand will not coincide with the interval between movements of the chart on the other meter. Even if the two clock springs of two meters are originally set to permit the two paper feeding movements to be made simultaneously, it is obvious that as the clocks run these movements will become increasingly out of phase with one another, thereby causing the intervals during which one component of the demand is recorded to differ from the intervals during which the other component is recorded, so that no true data as to the power factor are made available from the records.

It is an important object of my invention to overcome the foregoing difficulties by the provision of means for synchronizing the time element control mechanism of a plurality of demand recording meters. Thus by means of my invention the intervals during which active volt ampere demand is recorded by one meter can be made to correspond with the intervals during which reactive volt ampere demand is recorded by a second meter, so that the true power factor may be readily determined.

Fig. 3 is a front elevation of the spring and gear mechanism of two meters synchronized in accordance with my invention, certain parts being broken away.

Fig. 4 is a right hand end elevation of the timing and paper feed mechanism in one position, and Fig. 5 is a fragmentary view similar to Fig. 4 showing the timing mechanism in a different position.

Figure 1:
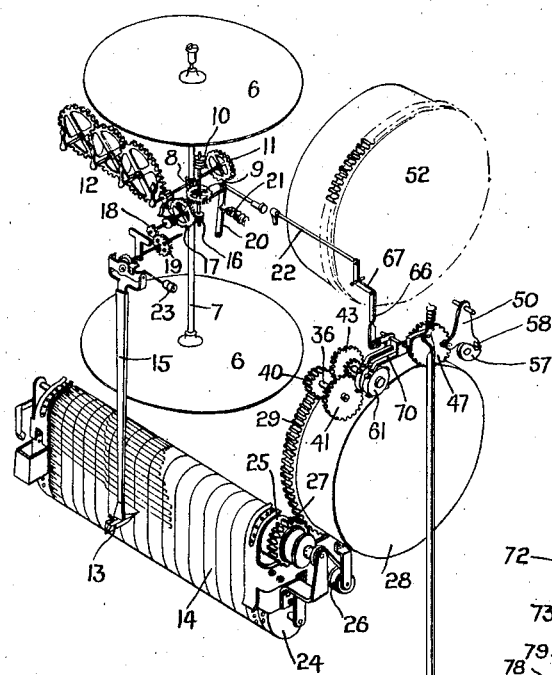
Fig. 1 is a diagrammatic perspective of two demand recording meters connected according to my invention, many of the parts being omitted for the sake of clearness.

Referring now to Fig. 1, two watt hour meters are shown in the position they would occupy if mounted one above the other on the usual panel board mounting. The upper meter may be electrically connected with a load circuit so that its discs 6 will rotate shaft 7 at a speed proportional to the active component of the load, driving through gears 8 and 9, worm 10, and gear 11 the indicator gears and hands designated in general 12, so that by the use of the usual dials (not shown) the total power consumed may be read directly in units such as kilowatt hours. Parts of the lower meter corresponding to those of the upper meter will be designated by the same numerals primed, or their reference characters omitted so that only those parts of the lower meter which have no counterpart in the upper meter need be separately described. When the two meters are employed for the purpose of obtaining data as to power factor, the lower meter will be electrically connected to the same load circuit, but in such a manner that discs 6' will rotate shaft 7' at a speed proportional to the reactive component of the load, so that the total reactive component may be read directly from the hands and dials 12' in units such as reactive-volt-ampere hours. The demand during each time interval is recorded graphically by the movement of a pen 13 over a chart 14. The pen is advanced from left to right across the chart, by the rotation of shaft 7, which moves pen arm 15, through the worm 16 and gears 17, 18 and 19. The shaft which carries gear 17 is mounted at its rear end in the pivoted lever 20, which is held in normal position with gear 17 in mesh with worm 16 by a spring 21. At the end of each time interval however, a trip rod 22 moves lever 20 to the left to disengage gear 17 from worm 16, at which time a weight 23 is free to return the pen arm to its zero position.

The chart 14 upon which the demand is recorded is carried on a roll 24 from which it passes over a feed roll 25 to a belt driven take-up roll 26. The chart is advanced at the end of each demand time interval by the rotation of feed roll 25, which carries at its right end a pinion 27 through which the power is applied. Power for advancing the chart is supplied by a spring motor consisting of a clock spring mounted within a drum 28 which carries a large gear 29 in engagement with pinion 27. The clock spring constantly urges gear 29 in a direction to rotate feed roll 25 to advance the chart, but gear 29 is normally prevented from moving by brake mechanism consisting of a gear train and a stop pin.

Figure 2:
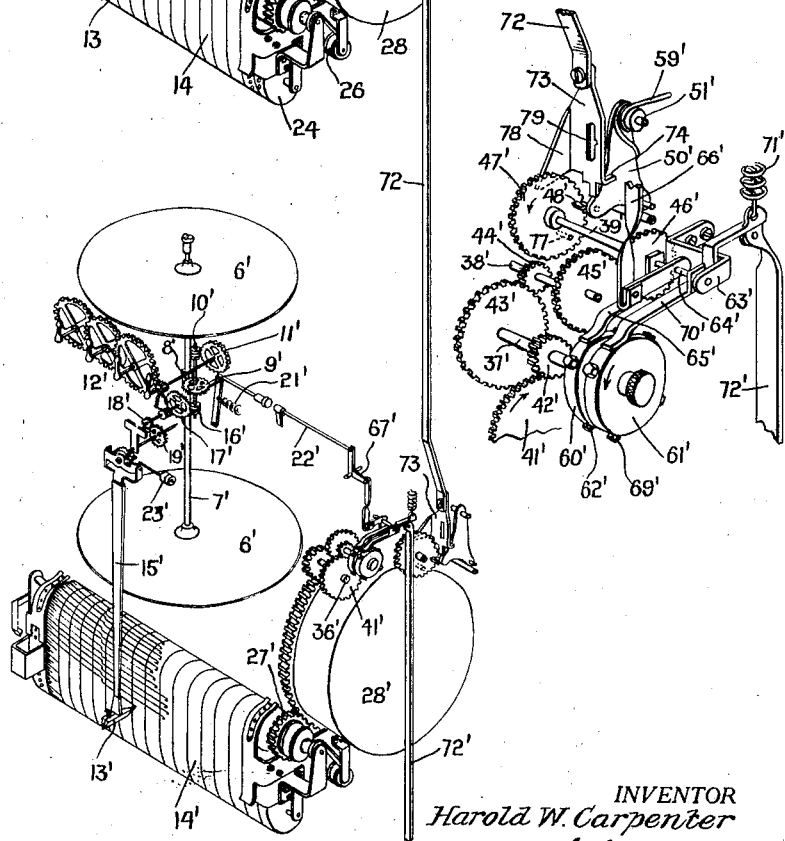
Fig. 2 is a similar view on a larger scale of certain details.

As shown in Figs. 3 and 4, drum 28 is carried by a tubular axle 30 journalled at its right hand end in a base plate 31 which is mounted on the meter casing, not shown. A journal plate 32 is secured to base plate 31 as by screws 33. An outer journal plate 34 is held in parallel spaced relation to plate 32 by posts 35. Journalled between the plates 32 and 34 are arbors 36, 37, 38 and 39 upon which are fixed the gear wheels forming part of the brake mechanism which controls the turning of gear 29. Gear 29 is urged by the spring contained within drum 28 to rotate in a counter-clockwise direction as seen in Figs. 1 and 4, and tends to rotate clockwise a gear 40 on arbor 36. Gear 41 on the same arbor drives gears 42 and 43 on arbor 37 counter-clockwise. Gear 43 meshing with a gear 44 on arbor 38 drives the same as well as a gear 45 on the same arbor. A gear 46 in mesh with gear 45 is rotated counter clockwise thereby, and turns its arbor 39 and a gear 47 carried thereon in the same direction. From the outer side of gear 47 near the periphery thereof there projects a half-round pin 48, which is normally engaged by a similarly shaped stop 49 projecting from the inner face of a dog 50 pivoted at 51, as shown in Figs. 2, 3, and 4. All the mechanism thus far described is alike on both meters, and is of the usual type. From the foregoing it is obvious that movement of dog 50 to the right, carrying stop pin 49 out of engagement with pin 48, will release the gear train and permit the clock spring to advance the chart 14 until the rotation of gear 47 is stopped.

To control directly the operation of dog 50 of the upper meter, there is provided clock mechanism driven by a spring within a drum 52 which is mounted on a tubular axle 53 journalled at its right end in base plate 31. A large gear 54 fixed on drum 52 drives (through an intermediate gear train not shown) a shaft 55, which constantly rotates clockwise at a speed regulated by suitable escapement mechanism located within a case 56, the escapement being driven by gear 54 through a gear assembly (not shown). The gear ratio between the spring drum 52 with its gear 54 and shaft 55 is such as to produce one complete revolution of shaft 55 in a certain predetermined time interval, usually fifteen minutes.

Fixed on shaft 55 is a spiral cam 57 adapted to engage a pin 58 extending from the outer face of the heel portion of dog 50. A light spring 59 clasping the rear edge of dog 50, and wound around the collar portion of the dog with its free end bearing against the post 35, holds pin 58 in contact with the surface of cam 57. This cam surface is so shaped that as it turns in a clockwise direction it gradually moves the foot of dog 50 to the right, thus withdrawing the flat face of pin 49 from engagement with the face of pin 48, until just as pin 58 reaches the corner made by the intersection of the radial and spiral faces of the cam (the position illustrated in Fig. 5) pin 49 releases pin 48 and permits the spring drum 28 to advance the chart 14. Immediately thereafter, however, pin 58 drops to the beginning of the spiral surface of the cam as illustrated in Fig. 4, and moves pin 49 back into position to stop pin 48 when gear 47 has completed one revolution. The reduction ration between gear 47 and gear 29 is such as to permit the proper advance of the chart (usually about one sixteenth of an inch) for each revolution of gear 47.

During one revolution of gear 47, arbor 37 turns through ninety degrees, thus rotating two wheels 60 and 61 mounted on said arbor through a quarter turn. Wheel 60 carries a number of studs 62 spaced equal distances apart about the periphery of the wheel, four studs being provided in the present embodiment of the invention. A bracket 63 secured to plate 34 supports one end of a pin 64 the other end of which is held by plate 34. Pivotally mounted on pin 64 is a lever 65 having a flat toe portion which rides over the periphery of wheel 60 and is raised each time one of the studs 62 passes thereunder when gear 47 makes a revolution. A rod 66 is pivoted at its lower hooked end to an angle portion of lever 65 near the toe thereof, and at its upper end is connected to the horizontal arm of a bell-crank 67. The bell crank is pivoted to a suitable bracket 68 supported by plate 34. Pen trip rod 22 is connected to the vertical arm of bell crank 67, and is moved to the left thereby each time a stud 62 passes under the toe of lever 65. Such movement of trip rod 22 resets the pen to its zero position in the manner previously described. If it is not desired to reset the pen each time the chart is advanced, some of the studs 62 may be omitted, so that the turning of wheel 60 through a quarter turn during the advance of the chart will be without effect on the pen. The records shown on the charts of Fig. 1 would result from the provision of only two studs 180° apart on wheel 60, in which case the pen would be reset only upon every second movement of the chart.

From the foregoing description it is apparent that the duration of the time interval between successive movements of the chart and resettings of the pen is controlled as regards the upper meter by clockwork driven from clock spring 52, while the power for these operations is supplied by spring 28. It has hitherto been customary to provide such clockwork individual to each meter to control its time interval. According to my invention, however, a single clock is used to control the time interval for any desired number of meters, the release of gear wheel 47 on the first meter by the clock driven cam 57 operating to release the corresponding wheel 47' on the next meter, and so on for any number of meters the chart movements of which it may be desired to synchronize. I accomplish this by connecting some part of the power spring driven mechanism of the first meter to the dog 50' of the next lower meter, so that movement of the spring drum 28 of the upper meter will move dog 50' of the lower meter and thus release its gear 47' to permit drum 28' to advance the chart 14'. In the present embodiment I mount a wheel 61 just outside wheel 60 on arbor 37, and set four studs 69 a quarter turn apart on the periphery of said wheel 61. On pin 64 I pivot a lever 70 having a toe which rides over wheel 61 and is raised by each stud as it passes under the toe. A tension spring 71 hung from a bracket 80 is secured to an upturned ear at the rear end of lever 70 to hold the toe of said lever in engagement with the wheel. Wheel 61 is adjustable relative to its arbor 37, and is positioned with a stud 69 normally close to the toe of lever 70 (as shown in Fig. 4) so that immediately dog 50 releases gear 47 the resulting rotation of arbor 37 and wheel 61 will raise the toe of lever 70. To a down turned ear at the rear of said lever I connect a vertical strip or rod 72, to the lower end of which is detachably secured a specially shaped lever 73. The lower end of lever 73 rests on the sloping edge of dog 50' just above the toe of said dog. To maintain the lever 73 in correct position relative to dog 50' I strike two lugs 74 rearwardly from the foot of the lever, one lug passing on either side of the dog, as shown in Figs. 2, 3 and 4. To carry the forward thrust on lever 73 resulting from downward pressure of the same on the edge of dog 50', I employ a thrust block 75 secured to the inner face of plate 34'. Through the thrust block there is threaded an adjustable guide screw 76 having a beveled end which engages the edges of a longitudinal slot 79 cut in lever 73. Thus the downward movement of lever 73 is guided both by the screw 76 and the lugs 74.

In operation, my connecting levers release dog 50' within a fraction of a second of the release of dog 50, since stud 69 in passing under lever 70 (upon the operation of dog 50 by cam 57) actuates lever 70 to lower rod 72 and thus by pressing the foot of lever 73 against the edge of dog 50' moves said dog to the right and withdraws pin 49' from pin 48'. Gear 47' is immediately set in motion by spring 28', so that the advance of the two charts 14 and 14' is practically simultaneous. A wheel 60' resets pen 13' of the lower meter in the manner described in connection with the corresponding parts of the upper meter. In order to aid spring 71 in lifting rod 72 and lever 73 back to normal position after stud 69 has passed from under the toe of lever 70, I employ a pin 77 on the inner face of gear 47' which strikes a sharp upward blow on the lower edge of a fin 78 which projects forwardly from lever 73 if this fin has not already been raised out of the path of movement of pin 77 by the time gear 47' has made a quarter revolution. Thus lever 73 is positively removed from its lower position in ample time to permit spring 59' to return dog 50' to normal position in which pin 49' will engage pin 48' to stop gear 47' after it has made one complete revolution.

If more than two meters are to be controlled by the same clock, I provide a wheel 61', lever 70' and rod 72' on the lower meter (as shown in Fig. 2) to actuate the dog 50" on the next lower meter (not shown). While it is most desirable to mount the meters for simultaneous operation one above another, obviously my invention is applicable to meters mounted in any other relative position, it merely being necessary to properly shape the rods 72 or supply additional linkage to connect them to the levers 73 as may be required. It is also to be noted that the mechanism for controlling the movements of the second and succeeding meters does not impose any strain on the clock of the first meter, since the power to operate this mechanism is in each case supplied by the power spring 28 of the preceding meter. Not only does my invention insure simultaneous operation of the charts of any desired number of recording meters, but it also obviates the provision of a separate clock for each meter, thereby considerably reducing the original cost and the expense of maintaining a set of meters.

I prefer to use a spring driven clock rather than a synchronous motor as the clock to measure time intervals for the first meter, as I am thus enabled to produce a continuous record regardless of shut offs of potential at the meter (a condition frequently met in practice) while obviously a synchronous motor driven from the line will stop during power-off periods, and the charts will consequently not be advanced continuously, but only when there is power on the line.

While I have described one embodiment of my invention with much particularity, and as applied to one type of meter, it is obvious that numerous changes may be made in the structure, parts substituted for other parts, and the invention applied to meters in which the original time control is accomplished by means other than clocks, all without departing from the spirit of the invention as defined by the appended claims.

I claim:

1. In combination a meter adapted to record the active component of an electric load on a chart, a meter adapted to record the reactive component of the same load on a second chart, a chart for each meter, a spring motor to move each chart, and a single clock to synchronize the operation of the two spring motors.

2. In combination a plurality of electric meters adapted to record load characteristics on movable charts, a chart for each meter, a separate motor to move each chart, and a clock to govern the operation of all the motors.

3. The combination in a series of electric meters each including a metering element, a demand recording element, a movable chart to cooperate therewith, means including a source of power to advance the chart, and brake mechanism normally preventing the operation of the chart advancing means; of means for releasing the brake mechanism of the first meter, and means on each meter responsive to the operation of the chart advancing means thereof for releasing the brake mechanism of the next succeeding meter of the series.

4. The combination with two electric meters each comprising a movable chart, means for producing a graphic record thereon, and means operable when released to advance the chart; of means for releasing the chart advancing means of the first meter at predetermined intervals, and means responsive to the operation of the chart advancing means of the first meter for releasing the chart advancing means of the second meter.

5. The combination of two electric recording meters, charts upon which the respective records are traced, a feed roll to advance each chart, spring means to operate each feed roll, a gear train to control the operation of each spring, and stop mechanism to maintain each gear train at rest, with a clock to periodically release the stop mechanism from the first gear train, and a lever actuated by said first gear train when in motion to release the stop mechanism from the second gear train.

6. The combination with two electric recording meters each including a movable chart, a feed roll to advance the chart, a spring drum to turn the feed roll, a gear train driven by the spring drum and comprising a terminal wheel, a pin projecting from said wheel, and a pivoted dog carrying a stop movable into engagement with said pin to stop the rotation of said wheel and gear train; of a cam on the first meter to swing said dog to withdraw said stop from engagement with said pin and thereafter permit said dog to move said stop back into the path of movement of said pin to stop the wheel after one revolution, means for revolving said cam, and means operated by said first meter gear train when in motion to move the second meter dog to withdraw its stop from engagement with the pin on said second meter terminal wheel.

7. The combination with two electric recording meters each including a movable chart, a feed roll to advance the chart, a motor to turn the feed roll, and brake mechanism to control the operation of the motor, of a clock to release the brake mechanism of the first meter at predetermined intervals, and a lever operated by said brake mechanism when released to release the brake mechanism of the second meter.

8. The combination with two electric recording meters each including a movable chart, a motor to advance the chart, a rotatable member driven by the motor to control the operation thereof, and a dog normally to engage said member to prevent rotation thereof, of a clock to release the dog of the first meter at predetermined intervals, a wheel rotated by the motor of said first meter, a lever to release the dog of the second meter, and linkage interconnecting said lever and wheel and operated in response to movement of the latter, whereby the motor of the second meter will advance its chart in synchronism with the advance of the first chart.

9. The combination with two electric recording meters each including a movable chart, a motor to advance the chart, a rotatable member driven by the motor to control the operation thereof, and a dog normally to engage said member to prevent rotation thereof, of a clock to release the dog of the first meter, a cam wheel rotated by the motor of the first meter when operating to advance the chart, a pivoted lever riding in engagement with the periphery of said wheel and moved by irregularities on the surface thereof, a spring to maintain said engagement, a second lever responsive to movement of the first lever to release the dog of the second, and adjustable guiding means to maintain predetermined relative position between said second lever and dog.

10. The combination with two electric recording meters each including a movable chart, a motor to advance the chart, a rotatable member driven by the motor to control the operation thereof, and a dog normally to engage said member to prevent rotation thereof, of a clock to release the dog of the first meter, a cam wheel rotated by the motor of the first meter when operating to advance the chart, a pivoted lever riding in engagement with the periphery of said wheel and moved by irregularities on the surface thereof, a second lever moved by operation of the first lever to release the second meter dog from its rotatable member, and means operable by said rotatable member during its revolution to restore said second lever to normal position whereby said second dog may return to normal position to stop said rotatable member.

11. The combination with two electric recording meters each including a movable chart, a motor to advance the chart, a rotatable member driven by the motor to control the operation thereof, and a dog normally to engage said member to prevent rotation thereof, of a clock to release the dog of the first meter, a cam wheel rotated by the motor of the first meter when operating to advance the chart, a pivoted lever riding in engagement with the periphery of said wheel and moved by irregularities on the surface thereof, a second lever moved by operation of the first lever to release the second meter dog from its rotatable member, a pin carried by said second rotatable member, and a fin on said second lever brought into the path of movement of said pin by dog releasing movement of said lever, said pin being adapted to strike said fin to restore said second lever to normal position.

HAROLD WAIT CARPENTER.

Witnesses:
R. E. WATROUS,
J. W. BROWN.